United States Patent [19]

Pinto

[11] Patent Number: 4,838,734
[45] Date of Patent: * Jun. 13, 1989

[54] METHOD AND DEVICE FOR FORMING A FLUID PERMEATION CONTROL LAYER OF THE GROUND

[76] Inventor: Shlomo Pinto, 50 Balfour Street, Naharia, Israel

[*] Notice: The portion of the term of this patent subsequent to May 19, 2004 has been disclaimed.

[21] Appl. No.: 49,550

[22] Filed: May 14, 1987

Related U.S. Application Data

[63] Continuation-in-part of Ser. No. 668,964, Nov. 7, 1984, Pat. No. 4,666,337.

[30] Foreign Application Priority Data

Nov. 8, 1983 [IL] Israel .................................. 70170

[51] Int. Cl.⁴ .......................... E02B 13/00; E02F 5/10
[52] U.S. Cl. ........................................ 405/176; 405/38; 405/179
[58] Field of Search ............... 405/38, 176, 179, 180, 405/270

[56] References Cited

U.S. PATENT DOCUMENTS

| | | |
|---|---|---|
| 1,803,838 | 5/1931 | Carpenter . |
| 2,158,952 | 5/1939 | Timberlake . |
| 3,276,208 | 10/1966 | Bolt ..................................... 405/38 |
| 3,405,528 | 10/1986 | Hansen et al. . |
| 3,590,588 | 7/1971 | Draper . |
| 3,618,329 | 11/1971 | Hanson . |
| 3,874,182 | 4/1975 | Potter et al. . |
| 4,073,152 | 2/1978 | Kishitani et al. . |
| 4,379,655 | 4/1983 | Brost et al. . |

FOREIGN PATENT DOCUMENTS

| | | |
|---|---|---|
| 1243111 | 6/1967 | Fed. Rep. of Germany . |
| 2199333 | 3/1974 | France . |
| 2232211 | 12/1974 | France . |
| 0051969 | 7/1982 | Israel . |
| 0058712 | 7/1983 | Israel . |
| 0718530 | 2/1980 | U.S.S.R. . |
| 0819263 | 4/1981 | U.S.S.R. . |
| 0869831 | 6/1961 | United Kingdom . |
| 0711551 | 7/1974 | United Kingdom . |

*Primary Examiner*—David H. Corbin
*Attorney, Agent, or Firm*—Sandler & Greenblum

[57] ABSTRACT

There is provided a method for forming a subterranean fluid permeation control layer in an area of ground. The method comprises the steps of forming a first portion of a trench of a predetermined depth from the surface of the ground and sequentially widening the trench along one side of the previously formed trench while selectively, simultaneously applying a fluid permeation layer substantially along the bottom surface of the previously formed trench and while at least partly covering the layer with earth removed from the widened portion of the trench being formed until the entire area of the ground is covered. The invention also provides a device for carrying out this method.

16 Claims, 4 Drawing Sheets

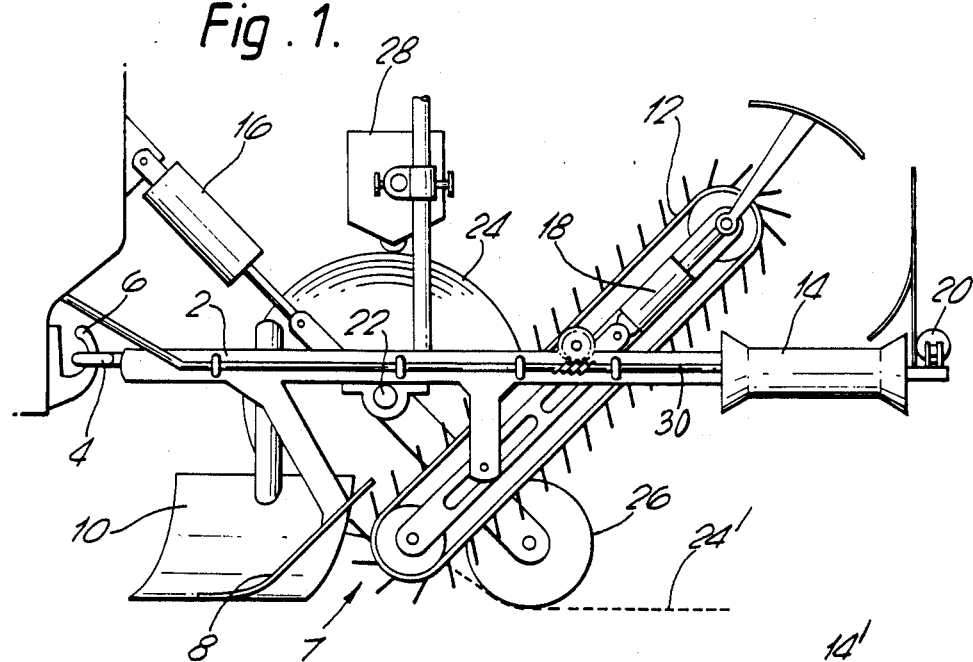
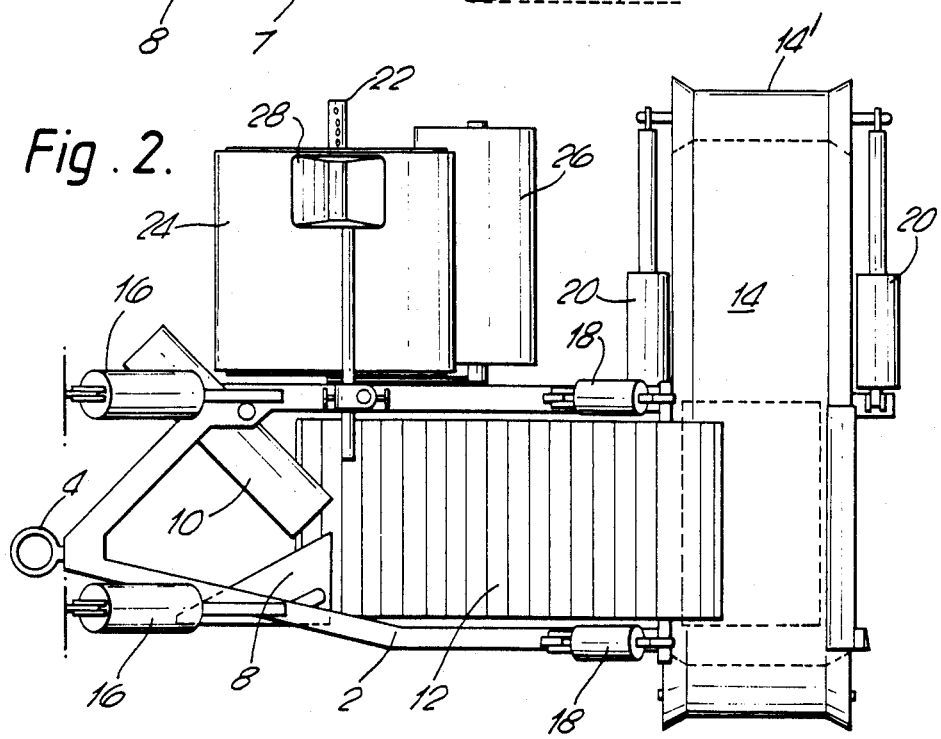

METHOD AND DEVICE FOR FORMING A FLUID PERMEATION CONTROL LAYER OF THE GROUND

This application is a continuation-in-part of copending application Ser. No. 668,964 filed Nov. 7, 1984, now U.S. Pat. No. 4,666,337.

The present invention relates to a method and a device for forming a subterranean fluid permeation control layer of an area of the ground for controlling fluid seepage therethrough.

A fluid permeation control layer at a predetermined depth under the ground may be generally utilized in various ways: to prevent uncontrolled escape of fluid into the ground from e.g. irrigated soil, water reservoirs, fish raising ponds and the like; to prevent underground fluids from rising above a desired level under specific areas such as roads, airfield landing strips or even in residential areas, as well as to control the escape of fluids from waste dumps.

There are known several methods of subterranean water-proofing. One known method of ground insulation is carried out by spraying an area with material such as tar, cement or the like, or penetrating the soil with sprayers and effecting the desired waterproofing by means of a subterranean spraying. Another known method is effected by spreading a waterproof medium, such as plastic sheets onto the ground and covering it with soil. Alternatively the sheet is spread subterraneously by means of a device which is described in Israel Patent No. 51961. The main disadvantage of the latter method resides in its incapability of spreading sheets in contact with each other such as to form an overlap and homogeneous water controlling surface.

Additionally, in order to perform the waterproofing at a reasonable depth, the device must be very powerful and even so, sometimes this task cannot be achieved due to unexpected below ground obstacles such as rocks, plant roots and the like.

Israeli Patent No. 58 712 suggests a method and a device for laying strips of flexible sheet material under the ground which method requires the ground soil to be first removed. In addition to the aforementioned disadvantage of subterranean operations, it is not believed that such a substantially "blind" attempt of waterproofing on area can be satisfactorily achieved.

Other representative devices and methods for insulation of the ground are described, e.g., in the U.S. Pat. Nos. 1,803,838 (Carpenter) and 3,618,329 (Hanson) and in the Russian Patent 718,530, which Patents essentially describe a device having at the front end thereof means for opening a trench, a roller of water repellent sheet material axially disposed underneath the device and adapted to spread the sheet material on the bottom of the trench which is currently formed and earh removing and depositing means, which conveys the dug out earth at the front of the device to the rear thereof, to be deposited on the unrolled sheet material and thereby close the trench which has just been opened.

This method of ground insualtion has the disadvantage that satisfactory overlap of adjacent strips of water repellent layers cannot be effectively achieved when the water repellent layer extends axially with the direction of travel, and thus an effective control of liquid seepage in the ground cannot be achieved.

It is therefore a broad object of the present invention to ameliorate the above disadvantages and to provide a method and a device for forming true subterranean fluid permeation control layer of an area of ground for controlling fluid escape therethrough.

The term fluid permeation control layer as used herein, is meant to designate any layer, preformed or formed in situ, which controls fluid flow therethrough, from a fluid-proof layer completely preventing fluid passage therethrough to a semi-permeable or permeable layer allowing a predetermined amount of fluid flow through the layer. Such a layer could be constituted by an uninterrupted flexible sheet material, for example, plastic sheets, by apertured sheet material, the size and quantity of the apertures depending on obvious considerations, by a woven or non-woven fabric material, by a permeable layer formed of consolidated pourable or sprayable material or by a combination of the above.

In accordance with these objects there is provided a method for forming a subterranean fluid permeation control layer in an area of ground for controlling fluid passage therethrough, comprising the steps of:

(a) forming a first portion of a trench of a predetermined depth from the surface of the ground;

(b) widening said trench along one side thereof to form a widened portion;

(c) applying a fluid permeation control layer substantially along the bottom surface of said first portion of said trench;

(d) at least partly covering said layer with earth removed from a widened portion of said trench; and (e) selectively repeating steps (b), (c) and (d) until the entire area of the ground is lined by the permeation control layer, wherein in repeating step (c) a newly applied layer is applied along a bottom surface of an adjacent, previously widened portion of the trench, partly contacting and overlapping an adjoining applied layer.

The invention further provides a device for forming a subterranean fluid permeation control layer in an area of ground for controlling fluid passage therethrough, comprising:

a chassis having a front end and a rear end;

earth digging means mounted on said chassis and associated with means for removing the dug-out earth from the ground to form a trench;

means mounted on said chassis for conveying said dug-out earth to a location laterally displaced from said earth digging means; and an applicator mounted on said chassis and arranged to apply a fluid permeation control layer substantially along the bottom surface of an initially formed or widened trench, laterally displaced from said earth digging means.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematical side elevational view of the device, according to the invention;

FIG. 2 is a schematical top plan view of the device of FIG. 1;

Figure 3:
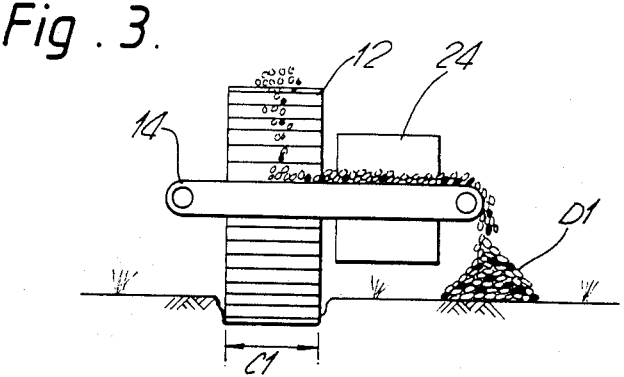
FIGS. 3 to 5 are schematical views illustrating the steps for carrying out the method according to the invention.

The device according to the invention illustrated in FIGS. 1 and 2 is of the type which is connectable to and pulled by, a tractor or any other propelling vehicle which is not shown, however, a self-propelled device can just as well be used. The device comprises a chassis indicated as a whole by the numeral 2. The chassis has a front end fitted with an eyelet 4 for coupling with a hook 6 of a propelling vehicle and an opposite rear end. Adjacent to the front end of the chassis there is mounted an earth digging means 7 which may be similar to a conventional plough share 8 and is specifically chosen in accordance with particular soil conditions.

Near the plough share 8, there is also connected to the chassis 2 a scraping member 10, the function of which is to flatten and smooth the dug in ground. There is further carried by the chassis 2 a trench excavator 12, e.g., a bucket excavator. As can be understood, the task of the plough share is to break up the soil in front of the trench excavator 12 and so to prevent undue pressure on that end of the excavator which is nearest to the soil. Both, the share 8 and scraper 10 push the ploughed soil lumps towards the excavator 12. In light soils, such as sandy areas, the use of share and scraper may not be necessary. The excavator 12 carries the dug out soil upwardly and rearwardly to deposit the removed soil on a band conveyor 14 which extends and runs substantially in a direction normal to the direction of travel of the device.

In order to permit the raising, lowering and levelling of the chassis 2, the latter is coupled to a pulling vehicle (not shown) by means of a set of hydraulic cylinders 16. A second set of hydraulic cylinders 18 can lower or raise the excavator 12 and so adjust its inclination. A third set of hydraulic cylinders 20 are responsible for adjusting the output end 14' of conveyor 14 with respect to the major axis of the excavator 12 so that the exact location of dug out soil deposition can be controlled.

The device is further equipped with a sheet strip support 22 carrying a roll 24 of plastic sheet strip 24' and a roller 26 for spreading and laying the sheet strips on the dug-out trench bottom surface. The exact position of mounting of the roll 24 itself on the chassis is not important. The important feature is the location of the point of deployment of the strip from the chassis to be deposited on the ground, which location according to the present invention should be adjacent to an outside lateral side of the chassis, or in some cases laterally displaced from the earth digging means 7. Near to the roll 24 there is disposed a dispenser 28 adapted to apply glue or sealants onto the unwound sheet strip so that upon laying overlapped layer at the trench bottom surface a positive seal will be obtained. Alternatively, the strips may be joined by welding and for this purpose a heated welding head is provided.

Both conveyors 12 and 14 are powered by a the propelling vehicle via the schematically shown drive shaft 30 and the required hydraulic power can also be supplied by vehicle as known per se.

The device may further be provided with an attachment for cleaning the sheet strip already on the trench bottom surface prior to the laying of an additional layer partly on it. Such an attachment may comprise a rotating brush, a vacuum suction cleaner, a blower or the like. The device may also be equipped with means for pressing the bottom surface of the open trench prior to spreading the sheet strips or the spraying of the insulating layer.

Figure 4:
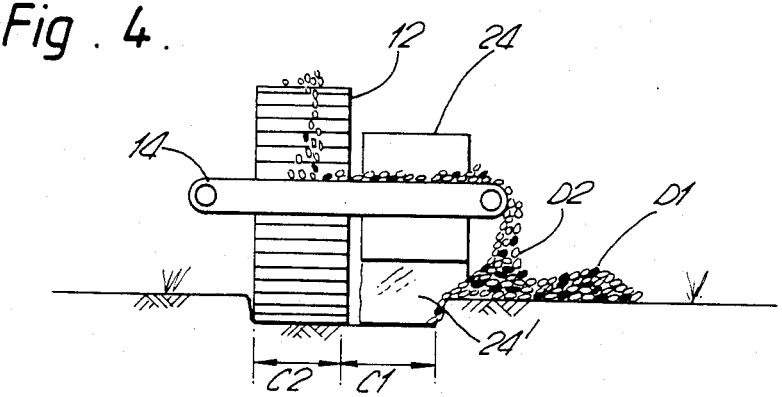
Figure 5:
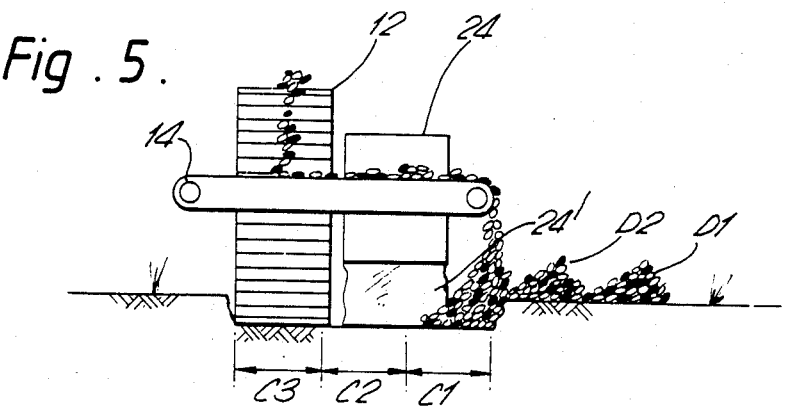

The manner in which the above described device operates will now be explained with reference to FIGS. 3–5. The device which is shown in a rear view travels along the edge of an area to be insulated. The share 8 and the excavator 12 produce a trench portion indicated by $C_1$ and the soil deposited on conveyor 14 is dumped along the path of the device at $D_1$. At the end of its path, the device turns around and widens said trench on one side thereof to form a widened trench portion indicated by $C_1$ and $C_2$. At the commencement of the return run the beginning of a sheet strip 24' from roll 24 is placed in the open trench portion $C_1$ and is fixed there, e.g. by placing some stones on it. Now, during travel the sheet is unwound and laid on the bottom surface of trench portion $C_1$, at the same time it is partially covered by soil $D_2$ dug-out from portion $C_2$ and dispensed from conveyor 14 on it. In this manner, the device travels from one edge of the area to its opposite edge, widening the original trench and depositing the dug-up soil in the trench portion dug-up before the one being dug, laying sheet material in the previously dug trench portion and covering it up with soil from the currently produced trench portion.

It should be realised that the device may selectively perform merely a digging run or a simultaneous digging and insulating layer depositing run, since in difficult soils it may not be possible to sufficiently widen the trench in a single run, for accommodation of the entire width of the sheet material.

In a preferred manner, the sheet strip is only partly covered by the soil from the trench portion being produced while spreading the adjacent strip in a partly overlapping fashion on the strip spread before. When employing this preferred manner of sheet strip laying, glue or sealant can be introduced by means of dispenser 28, between the overlapping sheet portions so as to effect the joining of the overlapping strips into a single layer. The individual strips may be joined by welding as described hereinbefore.

The same method for subterranean fluid permeation of an area of the ground can just as well be employed with the use of a sprayer spraying insulating or fluid repellent material such as tar, cement mix, or any other suitable synthetic sprayable substance. Hence, instead of the sheet strip applicator, there will be mounted a reservoir containing the sprayable or pourable material and one or more nozzles suitably aimed for covering a surface area beyond a lateral side of the earth digging means.

In order to provide the device with maximum operational flexibility, it is recommended to equip the chassis with two sets of fluid permeable deployment means on both lateral sides of the chassis, so that both directions of travel along an elongated path could be utilized for depositing the fluid permeable layer. Similarly, the chassis may be provided with an additional earth digging means. Naturally, there may be provided means for displacing a single fluid permeable deployment means from one lateral side of the chassis to the other.

Figure 6:
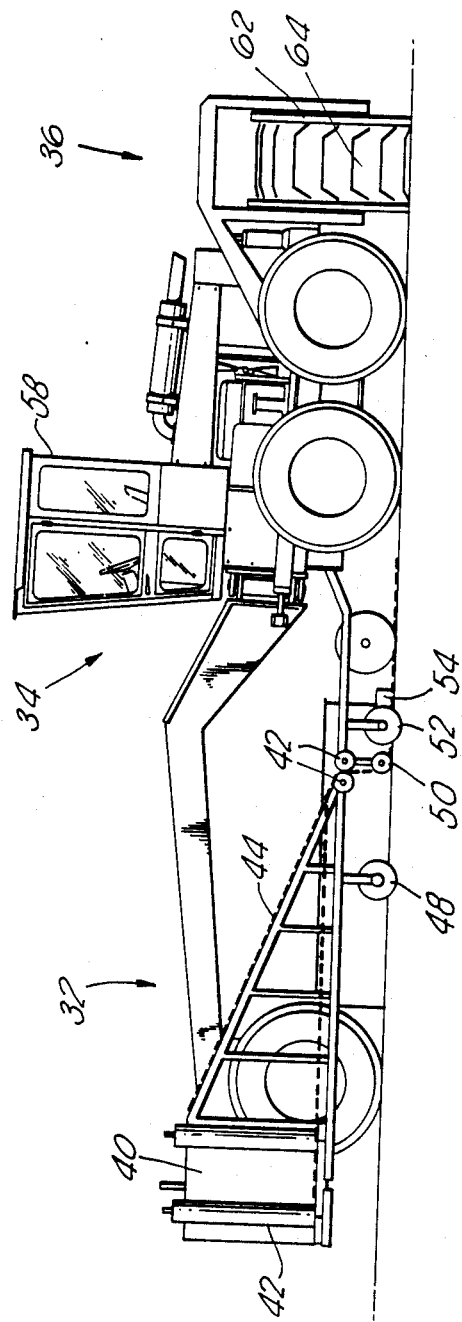
FIG. 6 is a schematical side elevational view of another embodiment of the device according to the invention.

In FIG. 6 there is illustrated another embodiment of a device according to the invention, basically differing from the device of FIGS. 1 and 2 in the relative location of the earth digging and conveying means and the fluid permeation control layer substance holding means, with respect to each other as mounted on the chassis of the device. While in the first embodiment the earth digging means is located in the front of the chassis (relative to the direction of travel), and there are provided suitable conveyer portions for transferring the dug-out earth from the front to the lateral rear end portion of the chassis, in FIGS. 6 and 7, there is illustrated a different arrangement wherein the earth digging means is located at the rear end of the device (relative to the normal direction of travel) while the storage housing of the fluid permeation layer is mounted at the opposite front end of the chassis. As seen, the device is composed of a front chassis section 32, a driving intermediate section 34 and a rear chassis section 36. On the chassis section 32 there is mounted an applicator 38 encasing a roll of folded sheet material 40. The folded sheet material is guided by means of rollers 42 to the sheet unfolding and deployment framework 44 on a lateral side of the device. Further mounted on the chassis section 32 is a ploughshare 46, similar to a road grader ploughshare used for smoothing the trench bottom surface prior to applying the sheet material on the ground. For clarity, there are not shown mounting and hydraulic control components, which are known per se. In order to secure the longitudinal edge of the sheet material to the ground to avoid its levitation by wind, there is provided a blade or plough implement 48 for cutting a furrow along the edge of the sheet just prior to the spreading of the latter. Upon the spreading of the sheet, it is pressed against the ground by roller 50, and a small wheel 52 pushes the edge of the sheet into the formed furrow. A small size blade 54 scrapes the earth displaced when forming the furrow, back into the sheet lined furrow to tighten the sheet edge therein. Two sheet deployment framework wheels 56 are also utilized for compacting both longitudinal edges of the sheet to the ground.

The sheet deployment operation can be continuously observed by the operator of the device driving the same from the environmental insulating chamber 58.

At the rear section of the device, there is mounted an earth digging and removing means in the form of one or more disc earth cutters 60. The cutters 60 are angularly oriented relative to the direction of travel and the dug-out earth removing and conveying means 62 so that in operation, the dug-out earth is propelled towards and onto the conveying means 62, having a conveying arm 64, to be transferred laterally with respect to the chassis and deposited on the sheet layer which has been spread on the bottom of the widened trench. Obviously, the conveying means 62 may be of the adjustable type, both with respect to the length of arm 64 as well as with respect to the arm's height above the surface of the ground. Hence the dug-out soil may be accurately deposited on any portion along the impermeable layer which has previously been applied, namely, which has been applied at the same run or at a former run.

Figure 7:
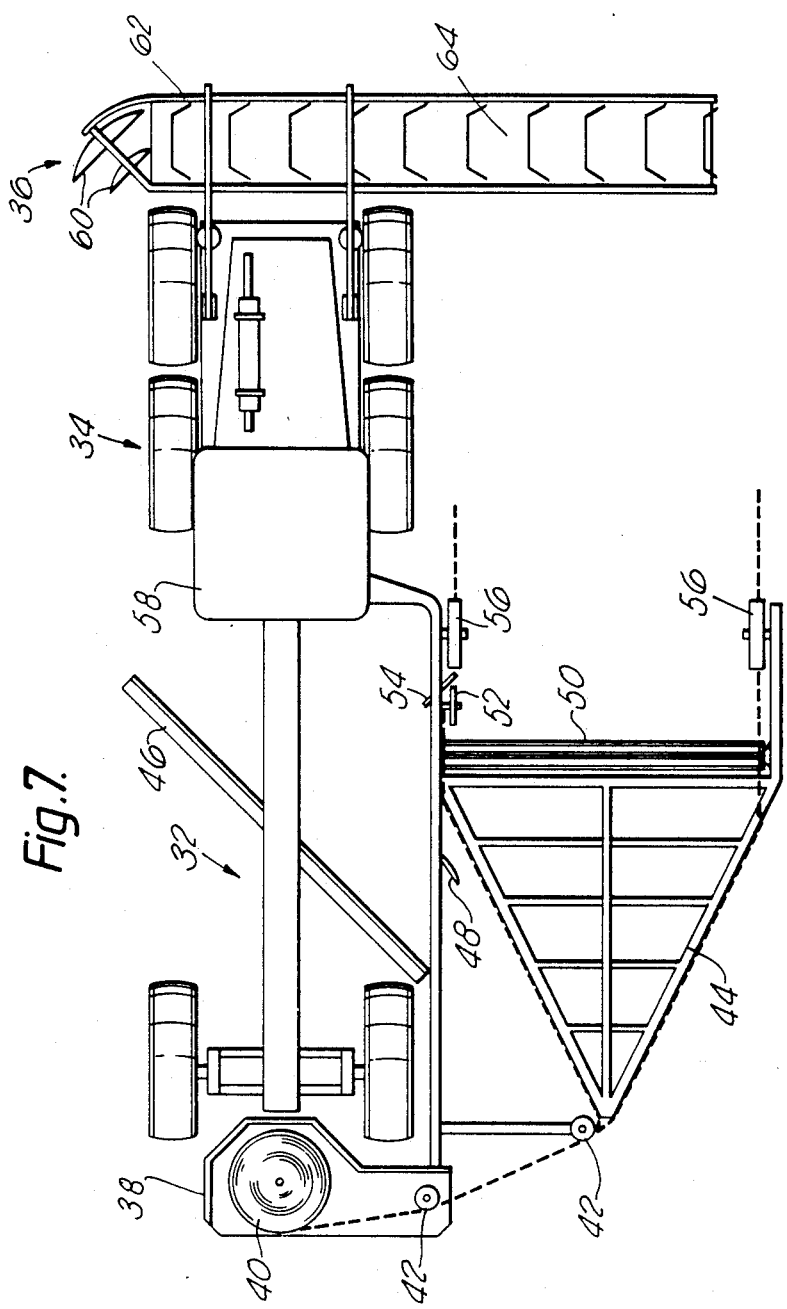
FIG. 7 is a schematical top plan view of the device of FIG. 6.

While the above description with regard to FIGS. 6 and 7 is directed to an embodiment wherein the fluid permeable layer is in the form of a sheet material, it should be understood that the device of FIGS. 6 and 7 is just as well suited for applying a sprayable or pourable fluid permeation control layer.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for forming a subterranean fluid permeation control layer in an area of ground for controlling fluid passage therethrough, comprising the steps of:
   (a) forming a first portion of a trench of a predetermined depth from the surface of the ground;
   (b) widening said trench along one side thereof to form a widened portion;
   (c) applying a fluid permeation control layer substantially along the bottom surface of said first portion of said trench;
   (d) only partly covering said layer with earth removed from a widened portion of said trench such that at least the edge of said layer adjacent said one side of the trench remains uncovered; and
   (e) selectively repeating steps (b), (c) and (d) until the entire area of the ground is lined by the permeation control layer, wherein, in repeating step (c) a newly applied layer is applied along the bottom surface of an adjacent, previously widened portion of the trench, partly contacting and overlapping an adjoining applied layer.

2. The method as claimed in claim 1 wherein said layer is a layer of sheet material which is applied on said bottom surface by rolling the same off a supply roll.

3. The method as claimed in claim 1 wherein said layer is formed by spraying fluid repellent material upon the bottom surface of said trench.

4. The method as claimed in claim 2 further comprising the step of causing the sheets adhere to each other along the overlapping area.

5. The method as claimed in claim 1 further comprising the step of smoothing the bottom surface of the trench prior to applying said layer.

6. The method as claimed in claim 2 further comprising the step of pressing said sheet material against the bottom of the trench after applying the same on the ground.

7. The method as claimed in claim 2 further comprising the step of securing at least portions of one of the sheet edges in the ground.

8. A device for forming a subterranean fluid permeation control layer in an area of ground for controlling fluid passage therethrough, comprising:
   a chassis having a front and a rear end;
   earth digging means mounted on said chassis and associated with means for removing the dug-out earth from the ground to form a trench;

powered conveying means mounted on said chassis for conveying said dug-out earth to a location laterally displaced from said earth digging means; and an applicator mounted on said chassis and arranged to apply a fluid permeation control layer substantially along the bottom surface of an initially formed or widened trench, laterally displaced from said earth digging means;

said conveying means being constructed and arranged such that the dug-out earth from an adjacent trench covers only a part of said layer leaving an edge thereof uncovered.

9. The device as claimed in claim 8 further comprising driving means therefor.

10. The device as claimed in claim 8 wherein said earth digging means includes a plough share and a scraper.

11. The device as claimed in claim 8 wherein said earth digging means includes at least one earth cutter angularly oriented with respect to the axis of said chassis.

12. A device for forming a subterranean fluid permeation control layer in a area of ground for controlling fluid passage therethrough, comprising: a chassis having a front and a rear end; earth digging means mounted on said chassis and associated with means for removing the dug-out earth from the ground to form a trench; conveying means mounted on said chassis for conveying said dug-out earth to a location laterally displaced from said earth digging means; and an applicator mounted on said chassis and arranged to apply a fluid permeation control layer substantially along the bottom surface of an initially formed or widened trench, laterally displaced from said earth digging means; said conveying means being constructed and arranged such that the dug-out earth from an adjacent trench covers only a part of said layer leaving an edge thereof uncovered; and wherein said means for conveying said dug-out earth is an endless belt conveyor mounted across said chassis.

13. The device as claimed in claim 12 wherein the lateral extension of the output end of said conveyor with respect to the major axis of the excavator, is adjustable.

14. The device as claimed in claim 8 wherein said applicator is a sheet strip applicator including a support for a supply roll and a framework for guiding and spreading said strip along the bottom of the trench.

15. The device as claimed in claim 14 further comprising means for effecting the joining of overlapping edges of said strips.

16. The device as claimed in claim 15 further comprising means for securing at least portions of one of the sheet strip longitudinal edges in the ground.

* * * * *